(12) United States Patent
Cornelissen et al.

(10) Patent No.: US 11,179,756 B2
(45) Date of Patent: Nov. 23, 2021

(54) LIGHT EMITTING ARRANGEMENT FOR ANTI-FOULING OF A PROTECTED SURFACE

(71) Applicant: KONINKLIJKE PHILIPS N.V., Eindhoven (NL)

(72) Inventors: Hugo Johan Cornelissen, Escharen (NL); Bart Andre Salters, Eindhoven (NL); Roelant Boudewijn Hietbrink, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 367 days.

(21) Appl. No.: 16/318,434

(22) PCT Filed: Jul. 24, 2017

(86) PCT No.: PCT/EP2017/068693
§ 371 (c)(1),
(2) Date: Jan. 17, 2019

(87) PCT Pub. No.: WO2018/019794
PCT Pub. Date: Feb. 1, 2018

(65) Prior Publication Data
US 2019/0291151 A1 Sep. 26, 2019

(30) Foreign Application Priority Data
Jul. 25, 2016 (EP) .................................... 16181059

(51) Int. Cl.
*B08B 17/02* (2006.01)
*B63B 59/04* (2006.01)
(Continued)

(52) U.S. Cl.
CPC .............. *B08B 17/02* (2013.01); *B63B 59/04* (2013.01); *G02B 6/0031* (2013.01);
(Continued)

(58) Field of Classification Search
CPC ....... B08B 17/02; B63B 59/04; G02B 6/0031; G02B 6/0035; G02B 6/0068; G02B 6/0073; G02B 6/0058; G02B 6/102
See application file for complete search history.

(56) References Cited

U.S. PATENT DOCUMENTS 7,364,336 B2 4/2008 Mori et al.
9,322,527 B2 4/2016 Lee
(Continued)

FOREIGN PATENT DOCUMENTS

JP 8297282 A 11/1996
WO 1994024482 A1 10/1994
(Continued)

*Primary Examiner* — Mary Ellen Bowman (57) ABSTRACT

A light emitting arrangement (100) for anti-fouling of a surface (30), comprises an optical medium (10) and at least one light source (20) for emitting anti-fouling light. A first zone (1) of the arrangement (100), which is closest to the light source (20), is arranged and configured to predominantly make the anti-fouling light reflect in a specular manner towards an emission surface (12) of the optical medium (10), through the optical medium (10), a second zone (2) of the arrangement (100) is arranged and configured to predominantly realize propagation of the anti-fouling light through the optical medium (10) by total internal reflection, and a third zone (3) of the arrangement (100), which is furthest away from the light source (20), is arranged and configured to predominantly make the anti-fouling light scatter out of the optical medium (10), through the emission surface (12) of the optical medium (10).

20 Claims, 2 Drawing Sheets

(51) Int. Cl.
*F21V 8/00* (2006.01)
*G02B 6/10* (2006.01)

(52) U.S. Cl.
CPC ......... *G02B 6/0035* (2013.01); *G02B 6/0068* (2013.01); *G02B 6/0073* (2013.01); *G02B 6/0058* (2013.01); *G02B 6/102* (2013.01)

(56) References Cited

U.S. PATENT DOCUMENTS

| | | |
|---|---|---|
| 2006/0013015 A1 | 1/2006 | Hashimoto |
| 2010/0061096 A1 | 3/2010 | Sato |
| 2011/0176089 A1 | 7/2011 | Ishikawa et al. |
| 2011/0292685 A1 | 12/2011 | Park et al. |
| 2012/0063160 A1 * | 3/2012 | Frankiewicz ............. F21L 4/00 362/555 |

FOREIGN PATENT DOCUMENTS

| | | | |
|---|---|---|---|
| WO | WO-9527919 A2 * | 10/1995 | ......... G02F 1/13362 |
| WO | WO-2010097499 A1 * | 9/2010 | ............. C02F 1/325 |
| WO | 2014188347 A1 | 11/2014 | |
| WO | WO-2014188347 A1 * | 11/2014 | ............... G02B 6/00 |
| WO | 2016001227 A1 | 1/2016 | |
| WO | WO-2017001209 A1 * | 1/2017 | ........... G02B 6/0043 |
| WO | WO-2018109142 A1 * | 6/2018 | ........... G02B 6/0068 |

\* cited by examiner

LIGHT EMITTING ARRANGEMENT FOR ANTI-FOULING OF A PROTECTED SURFACE

CROSS-REFERENCE TO PRIOR APPLICATIONS

This application is the U.S. National Phase application under 35 U.S.C. § 371 of International Application No. PCT/EP2017/068693, filed on 24 Jul. 2017, which claims the benefit of European Patent Application No. 16181059.3, filed on 25 Jul. 2016. These applications are hereby incorporated by reference herein.

FIELD OF THE INVENTION

The invention relates to a light emitting arrangement arranged and configured to realize anti-fouling of a protected surface to be immersed, at least during a part of the lifetime thereof, in a fouling liquid containing bio fouling organisms, the light emitting arrangement comprising an optical medium and a light source for emitting anti-fouling light, the optical medium comprising material that is configured to allow at least part of the anti-fouling light to distribute through the optical medium, wherein the optical medium comprises an emission surface for emitting the anti-fouling light in a direction away from the protected surface when the light emitting arrangement is in an operational position with respect to the protected surface, and a back surface for facing the protected surface.

BACKGROUND OF THE INVENTION

Bio fouling of surfaces which are exposed to water, during at least a part of their lifetime, is a well-known phenomenon, which causes substantial problems in many fields. For example, in the field of shipping, bio fouling on the hull of ships is known to cause a severe increase in drag of the ships, and thus increased fuel consumption of the ships. In this respect, it is estimated that an increase of up to 40% in fuel consumption can be attributed to biofouling.

In general, biofouling is the accumulation of microorganisms, plants, algae, small animals and the like on surfaces. According to some estimates, over 1,800 species comprising over 4,000 organisms are responsible for biofouling. Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

As mentioned in the foregoing, biofouling creates substantial problems. Bio fouling can cause machinery to stop working and water inlets to get clogged, to mention only two other negative consequences than the above-mentioned increase of drag of ships. Hence, the topic of anti-biofouling, i.e. the process of removing or preventing biofouling, is well-known.

WO 2014/188347 A1 discloses a method of anti-fouling of a surface while said surface is at least partially submersed in a liquid environment, in particular an aqueous or oily environment. The method involves providing an anti-fouling light and providing an optical medium in close proximity to the protected surface, the optical medium having a substantially planar emission surface. At least part of the light is distributed through the optical medium in a direction substantially parallel to the protected surface, and the anti-fouling light is emitted from the emission surface of the optical medium, in a direction away from the protected surface. The anti-fouling light may be ultraviolet light, and the optical medium may comprise ultraviolet transparent silicone, i.e. silicone that is substantially transparent to ultraviolet light, and/or ultraviolet grade fused silica, in particular quartz.

By applying the method known from WO 2014/188347 A1, it is possible to cover a protected surface to be kept clean from bio fouling, at least to a significant extent, with a layer that emits germicidal light. The protected surface can be the hull of a ship, as mentioned earlier, but the method is equally applicable to other types of surface.

WO 2014/188347 A1 further discloses a lighting module which is suitable to be used for putting the above-mentioned method to practice. Thus, the lighting module comprises at least one light source for generating anti-fouling light and an optical medium for distributing the anti-fouling light from the light source. The at least one light source and/or the optical medium may be at least partially arranged in, on and/or near the protected surface so as to emit the anti-fouling light in a direction away from the protected surface. The lighting module may be provided as a foil which is suitable for application to the protected surface. In any case, it is possible for the lighting module to comprise a two-dimensional grid of light sources for generating anti-fouling light and for the optical medium to be arranged to distribute at least part of the anti-fouling light from the two-dimensional grid of light sources across the optical medium so as to provide a two-dimensional distribution of anti-fouling light exiting a light emission surface of the light module.

The two-dimensional grid of light sources may be arranged in a chicken-wire structure, a close-packed structure, a rows/columns structure, or any other suitable regular or irregular structure. One of the advantages of providing a two-dimensional grid of light sources is that homogeneity of light distribution across the emission surface is increased. The fact is that by having increased homogeneity of light distribution across the emission surface, under-illuminated areas may be reduced or even prevented, where bio fouling may otherwise take place, while at the same time energy waste may be reduced or prevented as well, which may otherwise occur in over-illuminated areas receiving more light than needed for anti-fouling. WO 2014/188347 A1 also discloses that the light distribution across the emission surface may be further enhanced by having a pattern of scatters in appropriate places in the optical medium. In a general sense, it is indicated that ideas and solutions to obtain a better uniformity in a relatively thin optical structure involve an introduction of scatters and/or reflectors or other light spreaders directly in front of one or more light sources.

SUMMARY OF THE INVENTION

It follows from the foregoing that WO 2014/188347 A1 addresses the subject of improving homogeneity of light distribution across the emission surface of an anti-fouling lighting module. It is clear that without any measures being taken, light emitted from the emission surface decreases with the distance to the light source by means of which the light is generated. The invention is concerned with the same subject, and it is an object of the invention to provide a practical and uncomplicated way of realizing excellent distribution of anti-fouling light from a light source of a light emitting arrangement for anti-fouling of a protected surface.

According to the invention, a light emitting arrangement is provided, which is arranged and configured to realize anti-fouling of a protected surface to be immersed, at least during a part of the lifetime thereof, in a fouling liquid containing bio fouling mechanisms, and which comprises an optical medium and a light source for emitting anti-fouling light, the optical medium comprising material that is configured to allow at least part of the anti-fouling light to distribute through the optical medium, wherein the optical medium comprises an emission surface for emitting the anti-fouling light in a direction away from the protected surface when the light emitting arrangement is in an operational position with respect to the protected surface, and a back surface for facing the protected surface, and wherein the light emitting arrangement comprises a group of three zones covered by anti-fouling light from the light source, namely a first zone which is arranged and configured to predominantly make the anti-fouling light reflect in a specular manner towards the emission surface of the optical medium, through the optical medium, a second zone which is arranged and configured to predominantly realize propagation of the anti-fouling light through the optical medium by total internal reflection, and a third zone which is arranged and configured to predominantly make the anti-fouling light scatter out of the optical medium, through the emission surface of the optical medium, the first zone being closer to the light source than the second zone, and the second zone being closer to the light source than the third zone.

It appears from the above definition of the invention that when the invention is put to practice, an anti-fouling light emitting arrangement comprising an optical medium and a light source is provided, and that in this arrangement, three zones are associated with the light source, in a particular order. A first zone, which is closest to the light source, is used for predominantly reflecting the anti-fouling light towards the emission surface of the optical medium in a specular manner, i.e. a mirror-like manner, through the optical medium. A second zone, which is further away from the light source than the first zone, is suitable for realizing propagation of the anti-fouling light through the optical medium by total internal reflection. A third zone, which is furthest away from the light source, is used for predominantly scattering the anti-fouling light, i.e. reflecting the anti-fouling light in a diffuse manner, out of the optical medium, through the emission surface of the optical medium. By having the zones as mentioned, excellent distribution of anti-fouling light across the emission surface of the optical medium is achieved. On the basis of its specular reflecting properties, the first zone is capable of redirecting part of the emitted anti-fouling light in the right direction, that is to say, in the direction of the second zone and the third zone. The second zone is an intermediate zone which allows for light to propagate in the direction of the third zone. In both the first zone and the second zone, part of the light is emitted from the emission surface of the optical medium, especially where the light hits the emission surface at an angle which enables the light to escape from the optical medium through the emission surface. On the basis of its light scattering properties, the third zone is capable of directing practically all of the light that reaches this zone out of the optical medium, through the emission surface.

The indication of a zone being arranged and configured to predominantly realize a certain effect on the anti-fouling light, i.e. specular reflection towards the emission surface of the optical medium in the first zone, propagation through the optical medium by total internal reflection in the second zone, and scattering out of the optical medium in the third zone, is to be understood so as to mean that the effect is applicable to a major part of the light in that zone. For example, scattering of the light does not only take place in the third zone, but may also take place in the first zone and the second zone, respectively, to some extent. However, in the first zone and the second zone, other effects are predominant, whereas the third zone can be distinguished from those other two zones on the basis of the fact that only in the third zone, the light scattering effect is predominant and is applicable to a significantly larger part of the light than in the other two zones. In a similar manner, it is true that a total internal reflection effect may also be present in the first zone and the third zone, respectively, to some small extent, but is clearly predominant, i.e. applicable to a major part of the light, in the second zone, and that specular reflection towards the emission surface of the optical medium may also take place in the second zone and the third zone, respectively, to some small extent, but is by far the effect that is most present in the first zone.

The light emitting arrangement may be put in any suitable position with respect to the protected surface so as to be at an operational position with respect to the protected surface, including a position in which the light emitting arrangement is arranged in the protected surface, a position in which the light emitting arrangement is arranged on the protected surface and a position in which the light emitting arrangement is arranged near the protected surface, and any possible combination of those positions.

A first notable advantage of the invention is increased power efficiency leading to a larger clean area of the protected surface and/or to less power consumption. A second notable advantage of the invention is protection of the protected surface from high intensity radiation close to the light source. It may even be so that the light is blocked from exiting the optical medium at the back surface thereof in the first zone and the third zone, for instance by means of a specularly reflective layer and a scattering layer, respectively, which may be arranged on the optical medium at the back surface thereof, and that the light cannot escape from the optical medium at the back side thereof in the second zone as well, depending on the possible angles at which the light hits the back surface in the second zone, which angles can be kept within certain boundaries on the basis of design particulars of the light emitting arrangement. Furthermore, when the invention is applied, it is possible to have a light emitting arrangement that is transparent in a certain zone outside of the light source, namely at least in the second zone, which allows for visibility of the protected surface.

Advantageously, within the framework of the invention, it may be so that in the first zone, the emission surface of the optical medium is at least partially covered by a mirror, a reflective side of the mirror facing the emission surface. In such a case, the mirror as mentioned serves for decreasing the emission of anti-fouling light at the emission surface of the optical medium in the direct vicinity of the light source, thereby contributing to the desired homogeneous distribution of the light across the emission surface. Preferably, such a mirror is semi-transparent to the anti-fouling light. The mirror may be a patterned mirror, for example. In view of the desired homogeneous distribution of the light across the emission surface, it is an advantageous option to have a design of the semi-transparent mirror in which the extent to which the mirror is semi-transparent to the anti-fouling light increases in a direction away from the light source, so as to allow more light to pass through at a larger distance from the light source.

In any case, in order to enable the first zone to let the anti-fouling light reflect in a specular manner towards the emission surface of the optical medium, through the optical medium, particularly to let the anti-fouling light reflect at the back surface of the optical medium, it is practical if in the first zone, the back surface of the optical medium is at least partially covered by a mirror, a reflective side of the mirror facing the back surface. Total internal reflection of the light in the second zone may be promoted by providing the back surface of the optical medium with a low-index layer in that zone, which does not alter the fact that it is possible for the back surface of the optical medium to be free from any layer or other means for reducing an index of refraction in that zone. If a low-index layer is applied, it is practical for the index of refraction of that layer to be lower than an index of refraction of the fouling liquid in which the protected surface is to be immersed. Otherwise, adding a layer does not help in promoting total internal reflection when compared to a situation in which only the refractive indices of the material of the optical medium and the fouling liquid are decisive factors. Finally, in order to enable the third zone to let the anti-fouling light scatter out of the optical medium, through the emission surface of the optical medium, particularly to let the anti-fouling light scatter at the back surface of the optical medium, it is practical if in the third zone, the back surface of the optical medium is at least partially covered by a scattering layer, a scattering side of the scattering layer facing the back surface.

In a preferred embodiment of the light emitting arrangement according to the invention, the light source is positioned closer to a level of the emission surface of the optical medium than to a level of the back surface of the optical medium, so as to have an increased area of the emission surface where the power density of the light is above a predetermined threshold that is known to be relevant when it comes to achieving anti-fouling effects. Furthermore, in order to enhance the effectiveness of the design of the light emitting arrangement according to the invention, the light source may be arranged and configured so as to emit more than 50% of the anti-fouling light directly towards the back surface of the optical medium in the first zone. In this way, it can be achieved that in the first zone, a major part of the light is made to reflect in a specular manner and allowed to reach the second zone rather than to be emitted directly from the optical medium at the emission surface.

According to an insight underlying the invention, it is advantageous for the first zone to have a substantially circularly curved outer boundary and for the third zone to have a substantially circularly curved inner boundary, the light source being at the center of the circular shapes, so that the boundaries are at a constant distance from the light source as seen along the directions in which the anti-fouling light may travel from the light source. In order to achieve that in the first zone at least a major part of the light is reflected in a specular manner towards the emission surface of the optical medium, that in the second zone at least a major part of the light is propagated through the optical medium by total internal reflection, and that in the third zone at least a major part of the light is scattered out of the optical medium, through the emission surface of the optical medium, it is advantageous to relate a radial distance between the outer boundary of the first zone and the light source to positional aspects of the light source in the optical medium and a critical angle for total internal reflection in the optical medium and/or to relate a radial distance between the inner boundary of the third zone and the light source to dimensional aspects in the optical medium, positional aspects of the light source in the optical medium and a critical angle for total internal reflection in the optical medium. In particular, a radial distance between the substantially circularly curved outer boundary of the first zone and the light source may be chosen so as to be equal to or larger than $h_l/\tan(90°-\theta)$, and/or a radial distance between the substantially circularly curved inner boundary of the third zone and the light source may be chosen so as to be equal to or larger than $(h_e+(h_e-h_l))/\tan(90°-\theta)$, in which $h_l$ represents a height level of the light source with respect to the back surface of the optical medium, in which $h_e$ represents a height level of the emission surface of the optical medium with respect to the back surface of the optical medium, and in which $\theta$ represents a critical angle for total internal reflection in the optical medium, which is defined as $\arcsin(n_2/n_1)$, in which $n_1$ represents an index of refraction of the material of the optical medium, and in which $n_2$ represents an index of refraction of the fouling liquid in which the protected surface is to be immersed. In that way, it can be achieved that the design of the light emitting arrangement is optimized by taking the behavior of the anti-fouling light in the environment constituted by the optical medium and the adjacent fouling liquid into account, particularly the behavior as based on a range of angles of impact on the emission surface in which the light is capable of escaping from the optical medium and a range of angles of impact on the emission surface associated with total internal reflection of the light in the optical medium.

In a practical embodiment of the light emitting arrangement according to the invention, the optical medium is in the form of a slab, wherein the emission surface of the optical medium and the back surface of the optical medium are substantially planar and extend substantially parallel to each other. In that embodiment, the optical medium is very well suitable to be applied as a cover to the protected surface.

It is practical for the light source to be adapted to emit ultraviolet light. A general advantage of using ultraviolet light for realizing anti-bio fouling is that the microorganisms are prevented from adhering and rooting on the surface to be kept clean, without any harmful side effects or side effects which cannot be easily counteracted. The light source may be embedded in the optical medium, or may be arranged outside of the optical medium, at a position adjacent the optical medium.

For the sake of completeness, the following is noted in respect of anti-bio fouling by using ultraviolet light. The light source of the anti-fouling light emitting arrangement may be chosen to specifically emit ultraviolet light of the c type, which is also known as UVC light, and even more specifically, light with a wavelength roughly between 250 nm and 300 nm. It has been found that most fouling organisms are killed, rendered inactive, or rendered unable to reproduce by exposing them to a certain dose of the ultraviolet light. A typical intensity which appears to be suitable for realizing anti-bio fouling is 10 mW per square meter. The light may be applied continuously or at a suitable frequency, whatever is appropriate in a given situation, especially at a given light intensity. An LED is one type of UVC lamp which may be applied as the light source of the light emitting arrangement. It is a fact that LEDs can generally be included in relatively small packages and consume less power than other types of light sources. Also, LEDs can very well be embedded in a slab of material. Furthermore, LEDs can be manufactured to emit (ultraviolet) light of various desired wavelengths, and their operating parameters, most notably the output power, can be controlled to a high degree. The LED may be a so-called side-emitting LED, and may be arranged in the optical medium so as to emit the anti-fouling light in directions where the first zone, the second zone and the third zone are successively located.

When the light source is adapted to emit ultraviolet light, it is advantageous for the optical medium to comprise an ultraviolet transparent material such as ultraviolet transparent silicone. In a general sense, the fact that the optical medium comprises material that is configured to allow at least part of the anti-fouling light to distribute through the optical medium may be understood such as to imply that the optical medium comprises material that is substantially transparent to the anti-fouling light.

It is a practical possibility for the light emitting arrangement according to the invention to comprise a single optical medium and a plurality of light sources embedded in the optical medium, wherein the light emitting arrangement comprises a plurality of groups of the first zone, the second zone and the third zone, and wherein each of the light sources is associated with one of the groups. In such a case, the optical medium of the light emitting arrangement can be of any suitable shape and size, wherein light sources such as LEDs are distributed throughout the optical medium, and wherein the light emitted by each of the light sources is distributed across the emission surface of the optical medium to an optimized extent. The light sources can be arranged in a series of parallel connections in a grid, optionally a grid having a chicken-wire structure.

The invention is applicable in various contexts. For example, the light emitting arrangement according to the invention may be applied in the context of a marine vessel. In particular, in that context, the light emitting arrangement may be arranged so as to have a function in keeping the vessel's hull clean from biofouling, which does not alter the fact that numerous other application possibilities exist in that context as well.

The above-described and other aspects of the invention will be apparent from and elucidated with reference to the following detailed description of two embodiments of a light emitting arrangement comprising an optical medium and a number of light sources embedded in the optical medium, which light sources serve for emitting anti-fouling light, so that the light emitting arrangement is suitable to be used for anti-fouling of a protected surface.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
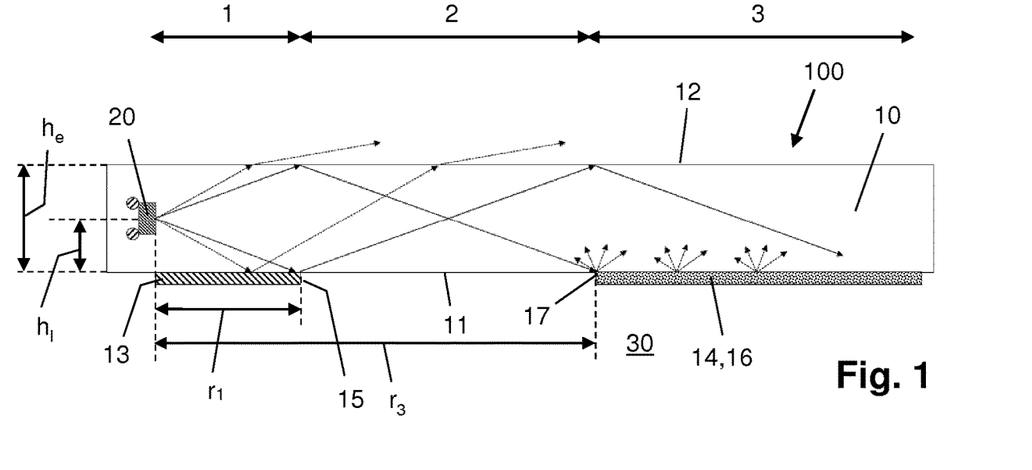
FIG. 1 relates to a first embodiment of a light emitting arrangement according to the invention, and diagrammatically shows a sectional view of a portion of an optical medium which is part of the light emitting arrangement, an LED embedded in the optical medium, and a mirror and a scattering layer as present at a back surface of the optical medium, wherein possible paths of light beams are diagrammatically indicated by means of arrows.
Figure 2:
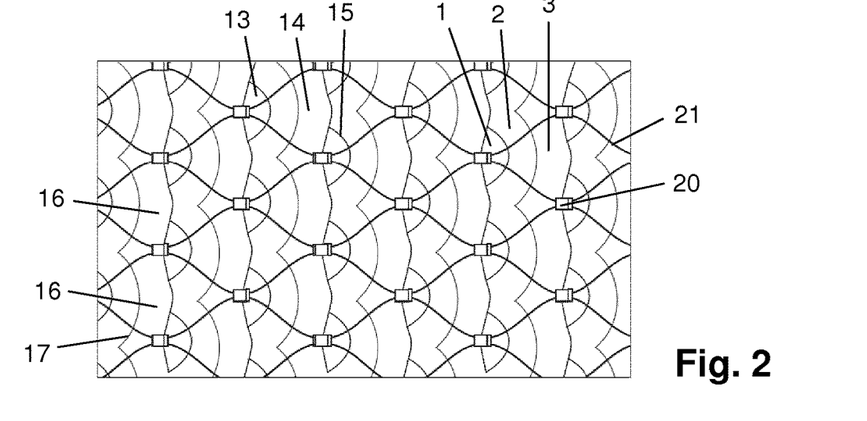
FIG. 2 diagrammatically shows a top view of a portion of the light emitting arrangement according to the first embodiment.
Figure 3:
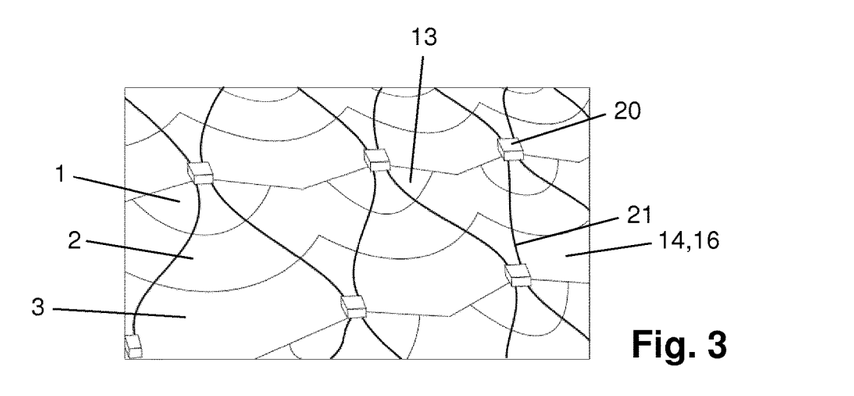
FIG. 3 diagrammatically shows a perspective top view of a portion of the light emitting arrangement according to the first embodiment.

FIGS. 1-3 relate to a first embodiment of a light emitting arrangement 100 according to the invention. The light emitting arrangement 100 comprises an optical medium in the form of a slab 10 of ultraviolet transparent silicone, and furthermore comprises a plurality of light sources in the form of side-emitting ultraviolet LEDs 20 embedded in the slab 10. In FIGS. 2 and 3, it can be seen that in the shown example, the light sources 20 are arranged in a series of parallel connections in a grid 21, particularly a grid 21 having a chicken-wire structure. That does not alter the fact that other arrangements of the light sources 20 are feasible within the framework of the invention.

The slab 10 has a back surface 11 for facing a protected surface 30, i.e. a surface which needs to be kept clean from bio fouling in an environment in which the surface is exposed to a fouling liquid, at least during a part of the lifetime thereof, and an emission surface 12 for emitting the ultraviolet light emitted by the LEDs 20 in a direction away from the protected surface 30. Besides a function in accommodating the LEDs 20, the slab 10 has a function in distributing at least part of the ultraviolet light of each of the LEDs 20 across a portion of the protected surface 30 before being emitted in the direction away from the protected surface 30.

FIGS. 1-3 provide a clear illustration of the fact that portions of the back surface 11 of the slab 10 are covered. In particular, a pattern of mirrors 13 for reflecting the ultraviolet light and scattering layers 14 for scattering the ultraviolet light is present so as to cover portions of the back surface 11 of the slab 10. The mirrors 13 have a substantially circularly curved outer boundary 15, and each of the mirrors 13 is associated with one of the LEDs 20, as can best be seen in FIG. 2, wherein the LEDs 20 are in the center of the substantially circularly curved shape of the outer boundary 15 of the mirrors 13. For the sake of completeness, it is noted that the reflective side of the mirrors 13 faces the back surface 11 of the slab 10. The scattering layers 14 comprise series of interconnected scattering layer portions 16 having a substantially circularly curved inner boundary 17, the inner boundary 17 of each of the scattering layer portions 16 having a concentric positioning with respect to the outer boundary 15 of one of the mirrors 13.

In each of the combinations of 1) an LED 20, 2) a mirror 13 associated with the LED 20, wherein the LED 20 has a substantially central position with respect to the outer boundary 15 of that mirror 13, and 3) a scattering layer portion 16 of which the inner boundary 17 has a substantially concentric positioning with respect to the outer boundary of that mirror 13, the inner boundary 17 of the scattering layer portion 16 extends at a distance from the outer boundary 15 of that mirror 13. On the basis thereof, groups of three zones 1, 2, 3 covered by the ultraviolet anti-fouling light from an LED 20 can be distinguished in the light emitting arrangement 100, namely a first zone 1 at the position of the mirror 13 associated with the LED 20, a third zone 3 at the position of the scattering layer portion 16 associated with both the LED 20 and that mirror 13, and a second zone 2 as present between the first zone 1 and the third zone 3.

The application of the mirrors 13 and the scattering layers 14 is aimed at improving the distribution of the ultraviolet light emitted by the LEDs 20 across the emission surface 12 of the slab 10, thereby achieving a more effective use of the ultraviolet light, which involves a reduction of power consumption of the light emitting arrangement 100, for example, and/or enables one LED 20 to cover a larger portion of the emission surface 12, so that the number of LEDs 20 can be kept to a minimum.

It follows from the foregoing that a group of three zones 1, 2, 3 is associated with each of the LEDs 20. In FIG. 1, one LED 20 and an associated group of zones 1, 2, 3 is diagrammatically shown, possible paths of light beams being diagrammatically indicated by means of arrows. The first zone 1 is closest to the LED 20. In view thereof, this zone 1 is designed so as to ensure that most of the light is propagated in the direction of the second zone 2 and the third zone 3. Only light beams hitting the emission surface 12 of the slab 10 in the first zone 1 at a relatively small angle to the normal of the emission surface 12 are allowed to (partially) escape from the slab 10. As is well-known in the field of optics, a critical value of the angle as mentioned is determined by the indices of refraction of the two materials as present at a boundary surface, which are the material of the slab 10 and the medium outside of the slab 10 in the case of the light emitting arrangement 100, wherein it is to be noted that the medium outside of the slab 10 is expected to be a fouling liquid. The other light beams hitting the emission surface 12 of the slab 10 in the first zone 1 are propagated in the direction of the second zone 2 and the third zone 3. In particular, those other light beams are not allowed to escape from the slab 10, but are reflected on the emission surface 12 instead, so that they are deflected in the direction of the back surface 11 of the slab 10, and exit the first zone 1 as they propagate. Furthermore, all light beams hitting the back surface 11 in the first zone 1 are not allowed to escape from the slab 10, but are reflected on the back surface 11 and/or the mirror 13 instead, which causes a substantial amount of the light to propagate in the direction of the second zone 2 and the third zone 3.

The light beams reaching the second zone 2 and hitting one of the back surface 11 and the emission surface 12 of the slab 10 are only allowed to escape from the slab 10 in the second zone 2 in case the angle of incidence of the light on the surface 11, 12 is smaller with respect to a normal of the surface 11, 12 than the critical angle. The configuration of the slab 10 accommodating the LED 20 is chosen so as to predominantly rely on total internal reflection in the second zone 2, so that only a relatively small amount of the light received from the first zone 1 is allowed to escape from the slab 10 at the emission surface 12 of the slab 10, whereas a relatively large amount of the light is made to propagate in the direction of the third zone 3. In order to enhance the light reflecting functionality in the second zone 2, a low-index layer (not shown) such as a sol-gel coating, especially a layer having a lower index of refraction than the fouling liquid, may be applied to the back surface 11 of the slab 10 in the second zone 2. It is also possible to have a suitable mirror (not shown) for covering at least a portion of the back surface 11 of the slab 10 in the second zone 2, a reflective side of the mirror facing the back surface 11.

The third zone 3 is the most remote from the LED 20. In view thereof, the scattering layer portion 16 is applied in the third zone 3, so that it is ensured that practically all of the light beams reaching the third zone 3 are directed towards the emission surface 12 of the slab 10, in such a way as to be oriented at a relatively small angle with respect to the normal of the emission surface 12. Hence, the third zone 3 is configured so as to direct practically all of the light remaining after having passed the first zone 1 and the second zone 2 out of the slab 10.

In the following, an example of possible values of dimensions and other parameters relating to the light emitting arrangement 100 is given. The LEDs 20 are assumed to be LEDs which are configured to emit ultraviolet light of the c type (UVC), and the slab 10 is assumed to be a transparent light guide slab having a thickness, i.e. a height $h_e$ of the emission surface 12 of the slab 10 with respect to the back surface 11 of the slab 10, of 10 mm. Furthermore, the LEDs 20 are assumed to be mounted to emit light in a sideway direction, at a height $h_l$ of 5 mm with respect to the back surface 11 of the slab 10. The index of refraction at a UVC wavelength of 275 nm of seawater and silicone are 1.38 and 1.46, respectively, resulting in a critical angle θ for total internal reflection equal to θ=arcsin (1.38/1.46)=70.9°. In order to have a very good light distribution effect across the emission surface 12 of the slab 10, it is advantageous for a radius $r_1$ of the outer boundary 15 of the first zone 1 to be equal to or larger than $r_1 = h_l / \tan(90°-\theta) = 14.5$ mm. Furthermore, it is advantageous for a radius r3 of the inner boundary 17 of the third zone 3 to be equal to or larger than $r_3 = (h_e + (h_e - h_l)) / \tan(90°-\theta) = 43.5$ mm. It is noted that $h_e$, $h_l$, $r_1$ and $r_3$ are indicated in FIG. 1.

The extent to which the light emitting arrangement 100 may be effective in realizing distribution of light across the emission surface 12 of the slab 10 may be even further enlarged by increasing $h_l$. For example, it may be practical to position the LEDs 20 at a height $h_l$ of 8 mm with respect to the back surface 11 of the slab 10. Furthermore, it may be beneficial to have a tilted orientation of the LEDs 20, particularly an orientation in which the LEDs 20 are arranged to emit light in a more downward direction, particularly to emit more than 50% of the light directly towards the back surface 11 of the slab 10 in the first zone 1.

Figure 4:
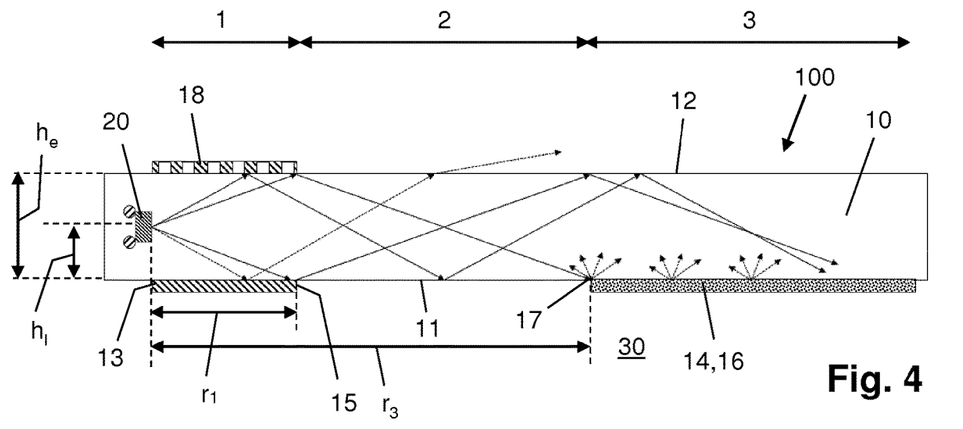
FIG. 4 relates to a second embodiment of a light emitting arrangement according to the invention, and diagrammatically shows a sectional view of a portion of an optical medium which is part of the light emitting arrangement, an LED embedded in the optical medium, a mirror and a scattering layer as present at a back surface of the optical medium, and a mirror as present at an emission surface of the optical medium, wherein possible paths of light beams are diagrammatically indicated by means of arrows.

FIG. 4 relates to a second embodiment of a light emitting arrangement 100 according to the invention, and particularly illustrates a possibility of applying an additional mirror 18 in the first zone 1, namely a mirror 18 for at least partially covering the emission surface 12 of the slab 10 in the first zone 1, a reflective side of the mirror 18 facing the emission surface 12. It is practical for such an additional mirror 18 to be semi-transparent to the light emitted by the LED 20. In view thereof, the mirror 18 may be a patterned mirror as diagrammatically indicated in FIG. 4. By having the additional mirror 18, it is possible to ensure that even more light is made to propagate from the first zone 1 towards the second zone 2 and the third zone 3 and to have a distribution of the light across the emission surface 12 of the slab 10 which is optimized even further. In that respect, it is an advantageous possibility for the additional mirror 18 to be designed in such a way that the semi-transparency thereof increases in a direction from the LED 20 to the outer boundary 15 of the first zone 1.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species". Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

In a general sense, it is a basic function of the light emitting arrangement 100 according to the invention to keep a protected surface 30 free from biofouling. Hence, the invention is applicable in all situations involving a fouling risk, which are situations in which the protected surface is intended to be immersed, at least during a part of the lifetime thereof, in a fouling liquid containing biofouling organisms. Seawater is a well-known example of such a fouling liquid. As mentioned earlier, the light emitting arrangement 100 according to the invention may be applied on a vessel's hull. Other examples of the protected surface 30 include the exterior surface of box coolers, surfaces of subsea off-shore equipment, interior walls of water reservoirs like ballast tanks of vessels, and filter surfaces of filter systems in desalination plants.

The optical medium 10 which is part of the light emitting arrangement 100 according to the invention may come in any suitable form, depending on the intended application of the light emitting arrangement 100. It may be practical for the optical medium 10 to comprise a slab of material as mentioned earlier, wherein the material may be any type of material which is suitable for allowing anti-fouling light to propagate through the optical medium 10. Furthermore, the material may be flexible, for example, so as to allow the slab to be bent in case such is necessary for following the outline of a protected surface 30. It may be so that the emission surface 12 and the back surface 11 of the optical medium 10 are substantially planar and extend substantially parallel to each other, in which case the optical medium 10 is of a generally flat design, but that does not alter the fact that other designs of the optical medium 10 are feasible within the framework of the invention. In case the optical medium 10 is of a generally flat design, it is practical for the three zones 1, 2, 3 to have a successive arrangement in the optical medium 10 in a direction in which the optical medium 10 extends, i.e. a direction that is substantially parallel to the emission surface 12 and the back surface 11 of the optical medium 10.

The invention is in no way limited to any specific positioning of the at least one light source 20 which is part of the light emitting arrangement 100 with respect to the optical medium 10. The at least one light source 20 may be arranged inside or outside of the optical medium 10, whatever is appropriate in a certain application of the invention and a design of the light emitting arrangement 100 optimized for that application.

The generally light scattering behavior of the third zone 3 can be achieved in various ways, including the way as shown and described, which involves using scattering layers 14 at the back surface 11 of the optical medium 10. Other feasible options involve having scratches on the back surface 11 of the optical medium 10, or periodic structures, lines, ridges or dents in(to) the surface 11.

The invention relates to a light emitting arrangement 100 having the particulars as explained in the foregoing, and furthermore relates to an assembly of the light emitting arrangement 100 and a protected surface 30 as shown in FIGS. 1 and 4, the light emitting arrangement 100 being in an operational position with respect to the protected surface 30, particularly being arranged in, on and/or near the protected surface 30.

Summarizing, a light emitting arrangement 100 is provided for anti-fouling of a protected surface 30 to be immersed, at least during a part of the lifetime thereof, in a fouling liquid containing biofouling organisms. The light emitting arrangement 100 comprises an optical medium 10 and at least one light source 20 for emitting anti-fouling light. At least one group of three successive zones 1, 2, 3, associated with a light source 20, can be distinguished in the light emitting arrangement 100, wherein a first zone 1, which is closest to the light source 20, is arranged and configured to predominantly make the anti-fouling light reflect in a specular manner towards an emission surface 12 of the optical medium 10, through the optical medium 10, a second zone 2 is arranged and configured to predominantly realize propagation of the anti-fouling light through the optical medium 10 by total internal reflection, and a third zone 3, which is furthest away from the light source 20, is arranged and configured to predominantly make the anti-fouling light scatter out of the optical medium 10, through the emission surface 12 of the optical medium 10.

The invention claimed is:

1. A light emitting arrangement arranged and configured to realize anti-fouling of a protected surface to be immersed, at least during a part of the lifetime thereof, in a fouling liquid containing biofouling organisms, the light emitting arrangement comprising:

an optical medium and a light source for emitting anti-fouling light, the optical medium comprising material that is configured to allow at least part of the anti-fouling light to distribute through the optical medium, wherein the optical medium comprises:

an emission surface for emitting the anti-fouling light in a direction away from the protected surface when the light emitting arrangement is in an operational position with respect to the protected surface, and a back surface for facing the protected surface, and wherein the light emitting arrangement comprises a group of three zones covered by anti-fouling light from the light source, wherein the three zones comprise:

a first zone in which a majority of the anti-fouling light from the light source reflected in a specular manner towards the emission surface of the optical medium, through the optical medium, a second zone in which a a majority of the anti-fouling light from the first zone is propagated through the optical medium by total internal reflection, and a third zone in which a majority of the anti-fouling light from the second zone is scattered out of the optical medium, through the emission surface of the optical medium, wherein the first zone is closer to the light source than the second zone, and the second zone is closer to the light source than the third zone.

2. The light emitting arrangement of claim 1, wherein, in the first zone, the emission surface of the optical medium is at least partially covered by a mirror, a reflective side of the mirror facing the emission surface.

3. The light emitting arrangement of claim 2, wherein the mirror is semi-transparent to the anti-fouling light.

4. The light emitting arrangement of claim 1, wherein, in the first zone, the back surface of the optical medium is at least partially covered by a mirror, a reflective side of the mirror facing the back surface.

5. The light emitting arrangement of claim 1, wherein, in the second zone, the back surface of the optical medium is provided with a low-index layer, and wherein an index of refraction of the low-index layer is lower than an index of refraction of the fouling liquid in which the protected surface is to be immersed.

6. The light emitting arrangement of claim 1, wherein, in the third zone, the back surface of the optical medium is at least partially covered by a scattering layer, a scattering side of the scattering layer facing the back surface.

7. The light emitting arrangement of claim 1, wherein the optical medium is of a generally flat design.

8. The light emitting arrangement of claim 1, wherein the light source is positioned closer to a level of the emission surface of the optical medium than to a level of the back surface of the optical medium.

9. The light emitting arrangement of claim 1, wherein the light source is arranged and configured to emit more than 50% of the anti-fouling light directly towards the back surface of the optical medium in the first zone.

10. The light emitting arrangement of claim 1, wherein;

the first zone has a substantially circularly curved outer boundary, a radial distance between the outer boundary and the light source is equal to or larger than $h_l/\tan(90°-\theta)$, wherein:

$h_l$ represents a height level of the light source with respect to the back surface of the optical medium, and $\theta$ represents a critical angle for total internal reflection in the optical medium, which is defined as $\arcsin(n_2/m_1)$, $n_1$ represents an index of refraction of the material of the optical medium, and $n_2$ represents an index of refraction of the fouling liquid in which the protected surface is to be immersed.

11. The light emitting arrangement of claim 1, wherein: the third zone has a substantially circularly curved inner boundary, a radial distance between the inner boundary and the light source being equal to or larger than $(h_e+(h_e-h_l))/\tan(90°\theta)$, wherein:

$h_e$ represents a height level of the emission surface of the optical medium with respect to the back surface of the optical medium, $h_l$ represents a height level of the light source with respect to the back surface of the optical medium, and $\theta$ represents a critical angle for total internal reflection in the optical medium, which is defined as $\arcsin(n_2/n_1)$, wherein $n_1$ represents an index of refraction of the material of the optical medium, and $n_2$ represents an index of refraction of the fouling liquid in which the protected surface is to be immersed.

12. The light emitting arrangement of claim 1, wherein: the optical medium is in the form of a slab, and wherein: the emission surface of the optical medium and the back surface of the optical medium are substantially planar and extend substantially parallel to each other.

13. The light emitting arrangement of claim 1, wherein the light source is adapted to emit ultraviolet light.

14. The light emitting arrangement of claim 1, comprising:

a single optical medium and a plurality of light sources embedded in the optical medium, wherein the light emitting arrangement comprises a plurality of groups of the first zone, the second zone and the third zone, and wherein each of the light sources is associated with one of the groups.

15. The light emitting arrangement of claim 14, wherein the light sources are arranged in a series of parallel connections in a grid.

16. A vessel comprising the light emitting arrangement of claim 1.

17. The light emitting arrangement of claim 3, wherein the extent to which the mirror is semi-transparent to the anti-fouling light increases in a direction away from the light source.

18. The light emitting arrangement of claim 13, wherein the optical medium comprises ultraviolet transparent silicone.

19. The light emitting arrangement of claim 15, wherein the grid has a chicken-wire structure.

20. An anti-fouling apparatus comprising:

an optical medium, and a plurality of ultraviolet LEDs arranged in a grid in the optical medium, wherein the optical medium in the vicinity of each LED comprises:

a first zone having a curved shape with a first curved boundary, wherein the LED is situated substantially at a center of the curved shape, a second zone with a second curved boundary that extends beyond the first curved boundary, the second curved boundary being substantially concentric with the first curved boundary, and a third zone that extends beyond the second curved boundary, wherein the first zone comprises a specular reflector, wherein the second zone propagates light from the first zone to the third zone via total internal reflection, and wherein the third zone scatters the light from the second zone.

* * * * *